(12) United States Patent
Gupta et al.

(10) Patent No.: US 9,207,467 B2
(45) Date of Patent: Dec. 8, 2015

(54) METHODS OF MAKING LENSES WITH REGRESSIVE AND NON-REGRESSIVE ROTATIONALLY SYMMETRIC OPTICAL DESIGN ELEMENTS

(71) Applicant: Mitsui Chemicals, Inc., Tokyo (JP)

(72) Inventors: Amitava Gupta, Roanoke, VA (US); Ronald Blum, Roanoke, VA (US); Stefan Troller, Sissach (CH); Hans Jaeger, Thunstetten (CH); Julien Sauvet, Lyss (CH); Urban Schnelll, Muenchenbuchsee (CH)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 14/045,571

(22) Filed: Oct. 3, 2013

(65) Prior Publication Data

US 2014/0160426 A1 Jun. 12, 2014

Related U.S. Application Data

(63) Continuation of application No. 12/902,213, filed on Oct. 12, 2010, now Pat. No. 8,573,774.

(60) Provisional application No. 61/356,569, filed on Jun. 19, 2010, provisional application No. 61/332,496, (Continued)

(51) Int. Cl.
*G02C 7/06* (2006.01)
(52) U.S. Cl.
CPC ............... *G02C 7/063* (2013.01); *G02C 7/061* (2013.01); *G02C 7/068* (2013.01)
(58) Field of Classification Search
CPC .......... G02C 7/061; G02C 7/063; G02C 7/068
See application file for complete search history.

(56) References Cited

U.S. PATENT DOCUMENTS 4,062,629 A 12/1977 Winthrop
4,461,550 A 7/1984 Legendre
(Continued)

FOREIGN PATENT DOCUMENTS

EP 0101972 3/1984
EP 0166071 1/1986
(Continued)

OTHER PUBLICATIONS

Search Report corresponding to the PCT/US2009/0052636 application, dated Jan. 28, 2011.
(Continued)

*Primary Examiner* — Jordan Schwartz
(74) *Attorney, Agent, or Firm* — Sterne, Kessler, Goldstein & Fox P.L.L.C.

(57) ABSTRACT

Aspects of the present invention provide an ophthalmic lens comprising at least one regressive and at least one non-regressive rotationally symmetric optical design element. The regressive and non-regressive optical design elements can be combined so as to form a desired optical power profile for the lens while simultaneously exploiting the different relative orientation of the astigmatic vectors of the constituent regressive and non-regressive design elements, thereby resulting in reduced unwanted astigmatism. The regressive and non-regressive rotationally symmetric optical design elements can be positioned on different lens surfaces and in optical communication or can be collapsed onto the same lens surface. The regressive and non-regressive rotationally symmetric optical design elements can each contribute to the total add power of an ophthalmic lens. The regressive and non-regressive rotationally symmetric optical design elements can be combined with any other optical design feature positioned on the same or a different surface of the lens.

5 Claims, 10 Drawing Sheets

Related U.S. Application Data filed on May 7, 2010, provisional application No. 61/324,457, filed on Apr. 15, 2010, provisional application No. 61/291,261, filed on Dec. 30, 2009, provisional application No. 61/251,333, filed on Oct. 14, 2009.

(56) References Cited

U.S. PATENT DOCUMENTS

| | | | |
|---|---|---|---|
| 5,305,028 A | | 4/1994 | Okano |
| 5,406,341 A | | 4/1995 | Blum |
| 5,598,234 A | | 1/1997 | Blum |
| 5,644,374 A | * | 7/1997 | Mukaiyama et al. ..... 351/159.42 |
| 5,926,250 A | * | 7/1999 | Mukaiyama et al. ..... 351/159.41 |
| 6,000,798 A | | 12/1999 | Chipman et al. |
| 6,019,470 A | | 2/2000 | Mukaiyama et al. |
| 6,086,203 A | | 7/2000 | Blum et al. |
| 6,089,713 A | | 7/2000 | Hof et al. |
| 6,106,118 A | | 8/2000 | Menezes et al. |
| 6,139,148 A | | 10/2000 | Menezes |
| 6,183,084 B1 | | 2/2001 | Chipman et al. |
| 6,199,984 B1 | | 3/2001 | Menezes |
| 6,229,595 B1 | | 5/2001 | McKinley et al. |
| 6,390,623 B1 | | 5/2002 | Kokonaski et al. |
| 6,409,340 B1 | | 6/2002 | Portney |
| 6,709,105 B2 | | 3/2004 | Menezes |
| 6,883,916 B2 | | 4/2005 | Menezes |
| 6,886,938 B1 | | 5/2005 | Menezes |
| 7,008,058 B2 | | 3/2006 | Haimerl et al. |
| 7,377,638 B2 | | 5/2008 | Gupta et al. |
| 8,573,774 B2 | * | 11/2013 | Gupta et al. ............. 351/159.42 |
| 2005/0083481 A1 | | 4/2005 | Dreher |
| 2005/0094096 A1 | | 5/2005 | Menezes |

FOREIGN PATENT DOCUMENTS

| | | |
|---|---|---|
| EP | 1640786 | 3/2006 |
| WO | WO 97/42530 | 11/1997 |

OTHER PUBLICATIONS

The International Search Report corresponding to the PCT/US2010/0023710 application, dated Jun. 4, 2010.

* cited by examiner

FIG. 7 ated on Oct. 12, 2010, which # METHODS OF MAKING LENSES WITH REGRESSIVE AND NON-REGRESSIVE ROTATIONALLY SYMMETRIC OPTICAL DESIGN ELEMENTS

CROSS-REFERENCE TO RELATED APPLICATIONS

This application claims priority from and incorporates by reference in their entirety the following provisional applications:

U.S. Appl. No. 61/251,333, filed on Oct. 14, 2009;
U.S. Appl. No. 61/291,261, filed on Dec. 30, 2009;
U.S. Appl. No. 61/324,457, filed on Apr. 15, 2010;
U.S. Appl. No. 61/332,496, filed on May 7, 2010; and
U.S. Appl. No. 61/356,569, filed on Jun. 19, 2010.

This application is a Continuation application of U.S. application Ser. No. 12/902,213 filed on Oct. 12, 2010, which is incorporated by reference in its entirety.

BACKGROUND OF THE INVENTION

1. Field of the Invention

The present invention generally relates to ophthalmic lenses. More specifically, the present invention provides improved ophthalmic lenses having reduced unwanted astigmatism.

2. Background Art

Conventional multifocal ophthalmic lenses (e.g., progressive addition lenses or PALs) provide a user with two or more vision zones. These conventional lenses, however, generally include large amounts of distortion (e.g., unwanted astigmatism) that can cause numerous vision compromises for the user. As a result, the benefits of the vision zones provided by such conventional lenses are reduced. Accordingly, what is needed is a new approach for designing multifocal ophthalmic lenses that can provide a desired progression of optical power but with reduced unwanted astigmatism.

DETAILED DESCRIPTION OF THE INVENTION

Aspects of the present invention provide an ophthalmic lens comprising at least one regressive rotationally symmetric optical design element and at least one non-regressive rotationally symmetric optical design element. The regressive and non-regressive optical design elements can be combined so as to form a desired optical power profile for the lens while simultaneously exploiting the different relative orientation of the astigmatic vectors of the constituent regressive and non-regressive design elements, thereby resulting in reduced unwanted astigmatism. The regressive and non-regressive rotationally symmetric optical design elements can be positioned on different lens surfaces and in optical communication or can be collapsed onto the same lens surface. The regressive and non-regressive rotationally symmetric optical design elements can each contribute to the total add power of an ophthalmic lens. The regressive and non-regressive rotationally symmetric optical design elements can be combined with any other optical design feature positioned on the same or a different surface of the lens.

Figure 1:
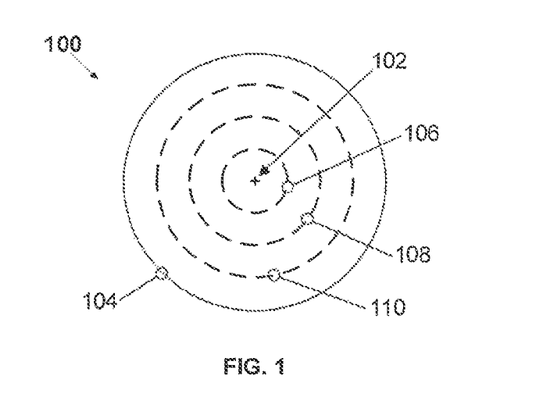
FIG. 1 illustrates an exemplary rotationally symmetric optical design element.

FIG. 1 illustrates an exemplary rotationally symmetric optical design element 100. The rotationally symmetric optical design element 100 can be positioned anywhere on an internal or an external surface of a lens. The rotationally symmetric optical design element 100 is shown as having a center 102 and an edge or boundary 104. The rotationally symmetric optical design element 100 can be of any size and can occupy any portion of a lens surface. In general, the rotationally symmetric optical design element can have a diameter (or largest width, e.g., if not circular) ranging from approximately 2.0 mm to approximately 25.0 mm.

The rotationally symmetric optical design element 100 can provide a progression of optical power (measured as average power or peak power) that is substantially the same in all radial directions. That is, the rotationally symmetrical optical design element 100 can have an optical power profile that is approximately equal in all directions when measured from the center 102 of the rotationally symmetric optical design element 100. The rotationally symmetric optical design element 100 can provide an increasing or decreasing progression of optical power, or a combination thereof. The optical power profile provided by the rotationally symmetric optical design element 100 can be continuous or discontinuous, or a combination thereof. Accordingly, the optical power profile provided by the rotationally symmetric optical design element 100 can include an optical power discontinuity.

The rotationally symmetric optical design element 100 is shown in FIG. 1 as having a circular shape but is not so limited. That is, the rotationally symmetric optical design element 100 can be of any shape including, but not limited to, ellipsoidal, triangular, or the shape of any convex polygon. Further, while the optical power profile of the rotationally symmetric optical design element 100 can be designed to be radially symmetric, the entirety of the rotationally symmetric optical design element 100 may not be contained or fully positioned on a lens or lens surface. Accordingly, the entirety of the rotationally symmetric optical design element 100 (as any shape) can be contained or positioned within the boundary of a lens surface or only a portion of the rotationally symmetric optical design element 100 can be contained or positioned on the lens surface.

Specifically, less than the entire rotationally symmetric optical design element 100 as a circular shape can be contained on the lens surface—for example, the rotationally symmetric optical design element 100 as a half-circle can be positioned on the lens surface. This can be accomplished by placing the center 102 of the rotationally symmetric optical design element 100 near an edge (e.g., a bottom edge) of the lens surface. In doing so, only a portion (e.g., approximately a half-circle shape of the top portion) of the rotationally symmetric optical design element 100 will subsequently be positioned on the lens surface and the remaining portion (e.g., approximately a half-circle shape of the bottom portion) will be positioned off the lens surface.

The rotationally symmetric optical design element 100 can be spherical or aspheric, or a combination thereof. The rotationally symmetric optical design element 100 can comprise any number of spherical and/or aspheric curves to form any desired optical power profile. Overall, the rotationally symmetric optical design element 100 can provide any optical power progression or change between the center 102 and the edge 104 of the rotationally symmetric optical design element 100.

As a regressive rotationally symmetric optical design element 100, an optical power can be provided at the center 102 that is lower than the optical power provided at the boundary 104. As a non-regressive rotationally symmetric optical design element 100, an optical power can be provided at the center 102 that is higher than the optical power provided at the boundary 104.

As either regressive or non-regressive, the rotationally symmetric optical design element 100 can provide increasing and/or decreasing optical power along a portion of the distance between the center 102 and the edge 104. That is, a regressive rotationally symmetric optical design element 100 need not provide only a progression of increasing optical power from the center 102 to the edge 104 and can instead provide regions of decreasing optical power. Similarly, a non-regressive rotationally optical design element 100 need not provide only a progression of decreasing optical power from the center 102 to the edge 104 and can instead also provide regions of increasing optical power.

The rotationally symmetric optical design element 100 can comprise any number of discontinuities (e.g., at or near the edge 104 or the center 102 or at any position there between) or can provide a continuous optical power profile without any discontinuities. Different types of possible discontinuities are described in more detail below.

The rotationally symmetric optical design element 100 is shown in FIG. 1 as comprising a first symmetric optical power region 106, a second symmetric optical power region 108 and a third symmetric optical power region 110. As described above, the rotationally symmetric optical design element 100 can comprise any number of optical power values between the center 102 and the edge 104. As such, the three optical power regions 106, 108 and 110 shown in FIG. 1 are for exemplary illustrative purposes only. The three optical power regions 106, 108 and 110 can provide any optical power and can be of the same or of a different optical power than any other region provided by the rotationally symmetric optical design element 100. Each of the symmetrical optical power regions 106, 108 and 110 can provide substantially the same optical powers at each respective radial position of the symmetrical optical power regions 106, 108 and 110.

As an example, the rotationally symmetric optical design element 100 as a regressive rotationally symmetric optical design element can provide an optical power with the optical power region 110 that is higher than an optical power provided by the optical power region 108 which, in turn, can be higher than an optical power provided by the optical power region 106. As another example, the rotationally symmetric optical design element 100 as a non-regressive rotationally symmetric optical design element can provide an optical power with the optical power region 110 that is lower than an optical power provided by the optical power region 108 which, in turn, can be lower than an optical power provided by the optical power region 106.

The rotationally symmetric optical design element 100 can be formed or positioned on any surface of an ophthalmic lens—for example, a multiple layer composite lens (having one or more internal surfaces or interfaces) or a single layer monolithic lens (having only external surfaces). Specifically, the rotationally symmetric optical design element 100 can be formed or positioned on an outer surface of an ophthalmic lens or can be positioned on an inner surface or interface of an ophthalmic lens. The rotationally symmetric optical design element 100 can be formed by mold or by free-form or by any other conventional lens manufacturing techniques.

Additionally, the rotationally symmetric optical design element 100 can be positioned on a lens surface to be in optical, communication with any other optical design element of feature positioned on a separate surface of lens. For example, the rotationally symmetric optical design element 100 can be positioned on a first surface of a lens so as to be in optical communication with a progressive optical power region positioned on a second surface of the lens.

The rotationally symmetric optical design element 100 can also be positioned on the same surface as any other optical design element or feature of a lens. This allows any portion of the rotationally symmetric optical design element 100 to overlap any portion of an additional optical design element or feature that is combined or collapsed onto the same lens surface.

Figure 2:
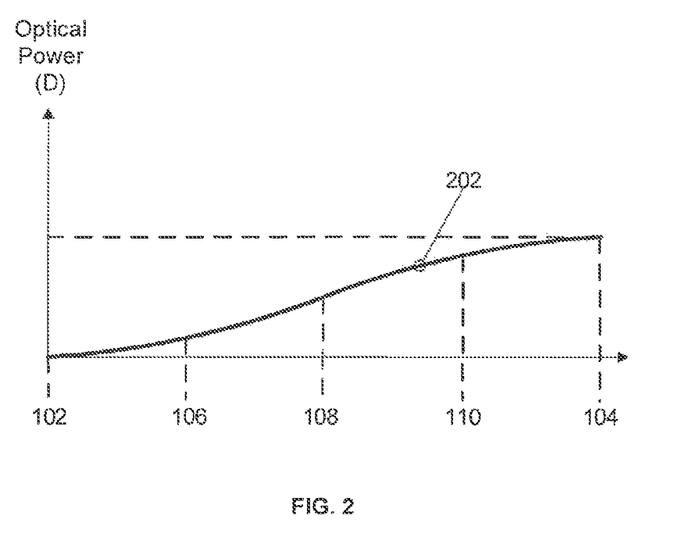
FIG. 2 illustrates an exemplary regressive power profile that can be provided by the rotationally symmetric optical design element depicted in FIG. 1.

FIG. 2 illustrates an exemplary regressive power profile 202 that can be provided by the rotationally symmetric optical design element 100. The regressive power profile 202 can be provided by the rotationally symmetric optical design element 100 as a regressive rotationally symmetric optical design element. The power profile 202 can be considered regressive because, as described above, the power profile 202 provides an optical power at the center 102 that is lower than an optical power provided a the edge 104.

Figure 3:
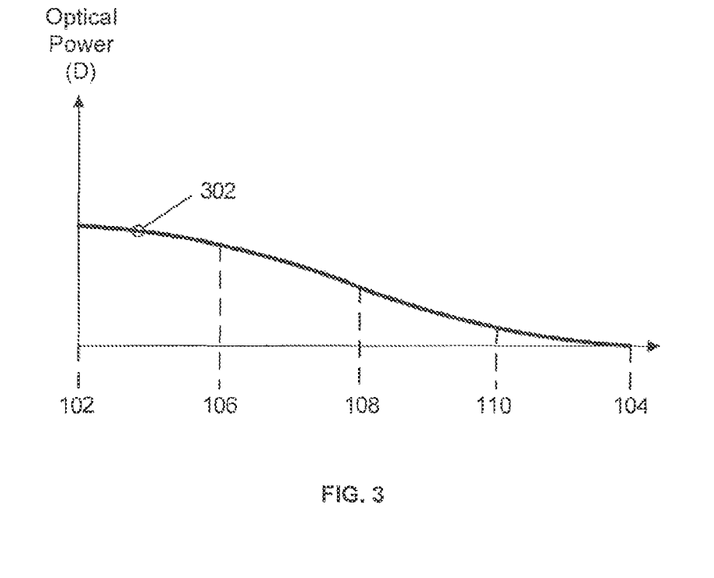
FIG. 3 illustrates an exemplary non-regressive power profile that can be provided by the rotationally symmetric optical design element depicted in FIG. 1.

As shown in FIG. 2, the regressive power profile 202 is continuous and provides a gradual increase in optical power moving from the center 102 to the edge 104. Further, FIG. 2 shows the relative optical powers provided by the optical power regions 106, 108 and 110, FIG. 3 illustrates an exemplary non-regressive power profile 302 that can be provided by the rotationally symmetric optical design element 100. The regressive power profile 302 can be provided by the rotationally symmetric optical design element 100 as a non-regressive rotationally symmetric optical design element. The power profile 302 can be considered non-regressive because, as described above, the power profile 302 provides an optical power at the center 102 that is higher than an optical power provided at the edge 104.

As shown in FIG. 3, the non-regressive power profile 302 is continuous and provides a gradual decrease in optical power moving from the center 102 to the edge 104. Further, FIG. 3 shows the relative optical powers provided by the optical power regions 106, 108 and 110.

The rotationally symmetric optical design element 100 can be continuous or discontinuous at the edge 104 of the design element (or a combination thereof—that is, a portion of the boundary can form a discontinuity while other portions can be continuous). A first type of discontinuity can be a sagittal (sag) discontinuity that can form a jump or break between the rotationally symmetric optical design element 100 and a lens surface onto which it is placed. A second type of discontinuity can be a slope discontinuity (also referred to as a prism discontinuity). A third type of discontinuity can be a discontinuity in curvature or power.

A lens of the present invention can comprise one or more rotationally symmetric optical design elements 100 positioned on one or more surfaces of the lens. One or more rotationally symmetric optical design elements 100 can be used to provide a desired optical power progression for a lens while reducing unwanted astigmatism caused by the blending of surfaces of different curvatures over areas in the lens that are used for static and dynamic visual tasks. Additionally, the one or more rotationally symmetric optical design elements 100 can be used to modify the contours of power and unwanted astigmatism of a lens (e.g., a multifocal lens such as a progressive addition lens).

As mentioned above, the one or more rotationally symmetric optical design elements 100 can be positioned on multiple surfaces of the lens so as to be in optical communication with one another or any other type of optical feature or design element (e.g., each rotationally symmetric optical design element 100 being placed on a separate lens surface). The one or more rotationally symmetric optical design elements 100 can be positioned on the same surface of the lens. When one or more rotationally symmetric optical design elements 100 are positioned on the same surface of the lens, the rotationally symmetric optical design elements 100 can be positioned so as to overlap, partially overlap or to not overlap.

The astigmatism associated with the surface of the rotationally symmetric optical design element 100 is generally radially symmetric (i.e., the astigmatism vectors associated with the surface of a rotationally symmetric optical design element are generally radially symmetric). The magnitude of the astigmatism vectors associated with the rotationally symmetric optical design 100 can depend on a number of factors including the optical power profile of the design element. The direction of orientation of the astigmatism vectors associated with the rotationally symmetric optical design 100 can depend on a number of factors including whether the design element is of a regressive or non-regressive design.

Specifically, the rotationally symmetric optical design element 100—as a regressive rotationally symmetric optical design element—generally comprises astigmatism that can be expressed as astigmatism vectors that are radially symmetric and perpendicular to the symmetric optical power regions 106-110. In contrast, the rotationally symmetric optical design element 100—as a non-regressive rotationally symmetric optical design element—generally comprises astigmatism that can be expressed as astigmatism vectors that are radially symmetric and parallel to the symmetric optical power regions 106-110. Accordingly, the orientation of the astigmatism vectors associated with a regressive rotationally symmetric optical design element are generally orthogonal to the astigmatism vectors associated with a non-regressive rotationally symmetric optical design element.

Given that the astigmatism vectors associated with regressive and non-regressive rotationally symmetric optical design elements are approximately orthogonal to one another, combining regressive and non-regressive rotationally symmetric optical design elements either to be in optical communication with one another or overlapping (at least partially) and collapsed onto the same surface of a lens—can lead to reduction of the combined astigmatism of both elements. That is, the astigmatism vectors associated with a regressive rotationally symmetric optical design element can be used to neutralize (i.e., reduce or minimize) the astigmatism vectors associated with a non-regressive rotationally symmetric optical design element (and vice versa).

This ability to reduce the resulting combined astigmatism of two distinct optical elements can be achieved by at least a partial overlap of regressive and non-regressive rotationally symmetric optical design elements. Specifically, a portion of a regressive rotationally symmetric optical design element can be positioned so as to overlap a portion of a non-regressive rotationally symmetric optical design element with the overlapping portions having a resulting neutralized or reduced level of astigmatism. The astigmatism level (e.g., in terms of magnitude) of the combined regressive and non-regressive rotationally symmetric optical design elements (combined either to be in optical communication when positioned on separate lens surfaces or collapsed to be on the same surface) can therefore be less than the sum of the individual astigmatism levels of the rotationally symmetric optical design elements.

Accordingly, a lens of the present invention can comprise regressive and non-regressive rotationally symmetric regressive optical design elements positioned so as to benefit from the astigmatism reducing capabilities resulting from the different relative orientation of the astigmatic vectors of these design elements (which are substantially orthogonal to each other as discussed above).

A lens of the present invention can therefore comprise one or more regressive rotationally symmetric optical design elements and one or more non-regressive rotationally symmetric optical design elements positioned so as to reduce the resulting astigmatism associated with the combined constituent elements. The one or more regressive rotationally symmetric optical design elements and the one or more non-regressive rotationally symmetric optical design elements can be combined in any manner to provide any desired optical power profile. For example, superposition of one or more regressive rotationally symmetric optical design elements and one or more non-regressive rotationally symmetric optical design elements can be used to form a progressive addition lens (PAL) design or other multifocal lens design. The total add power of a lens can therefore be provided by the individual add power components provided by overlapping regions of one or more regressive and non-regressive rotationally symmetric optical design elements.

The one or more regressive rotationally symmetric optical design elements and the one or more non-regressive rotationally symmetric optical design elements can also be used to enhance certain regions of an existing lens design. For example, a given progressive lens design can be enhanced (e.g., in terms of reduced astigmatism) by select placement of regressive and non-regressive rotationally symmetric optical design elements (e.g., positioned so as to enhance one or more vision zones or to reduce high astigmatism regions of the lens).

In general, aspects of the present invention include lenses comprising any combination and number of regressive and non-regressive rotationally symmetric optical design elements that can be combined onto one or more surfaces to form or enhance any region or vision zone of a lens or to determine any or all of the optical features of a lens or lens surface.

To collapse or combine one or more regressive and non-regressive rotationally symmetric optical design elements onto the same surface of a lens, the incremental sag values contributed by each design element can be added to the sag value of the base curve (which is typically a spherical surface ranging from 0.0 D to 10.0 Diopters in power). The one or more regressive and non-regressive rotationally symmetric optical design elements can also be collapsed or combined onto the same surface of a lens by a summation process of adding the same lens surface X/Y coordinates of each element.

When the rotationally symmetric design element 100 is placed onto a lens surface, the boundary 104 can form a discontinuity or can be blended to approximately match a curvature of the lens surface or other optical element that it may overlap. For example, the rotationally symmetric design element 100 can be collapsed onto a base curve of a lens such that all or a portion of the boundary of the design element forms a discontinuity with the lens surface. Alternatively, all or a portion of the boundary can be collapsed onto an existing lens by blending such that no sag difference, prism or magnification jump results. Overall, boundaries between contiguous zones of a lens of the present invention can be continuous, or discontinuous, either in slope, prism or optical power.

The use of discontinuous boundaries can obviate the need to create a continuous surface from multiple design elements of different curvatures that can be placed onto a lens surface, and can therefore serve to reduce the magnitude of astigmatism typically accompanying blend zones. Discontinuities can cause visual disturbance, and can therefore detract from the optical quality of a lens design. It is known that there are thresholds of visual perception of discontinuities, and it is possible to provide discontinuities below such thresholds to minimize or avoid such visual disturbances. Further, it may be possible to place introduced discontinuities at locations that may not interfere with a user's vision—for example, by positioning the discontinuities at the periphery of the lens so as to not interfere with specific vision zones of the lens.

The use of a continuous or blended boundary 104 can obviate the need for introducing discontinuity onto a lens surface. However, blending can introduce astigmatism. The introduced astigmatism can often be minimized by ensuring that a curvature or optical power of the boundary 104 (at or near the boundary 104) of the rotationally symmetric optical design element 100 closely matches the curvature or optical power of the surface onto which the element is placed (or other design element that it may overlap).

Each regressive and non-regressive rotationally symmetric optical design elements included in the design of a lens can have a number of characteristics that can be individually varied to achieve a particular optical design including, but not limited to, the following: (1) the optical power profile (including magnitude) of each constituent regressive and non-regressive rotationally symmetric optical design elements; (2) the size (e.g., radius) of each constituent regressive and non-regressive rotationally symmetric optical design elements; (3) the positioning and distance between or overlap of each constituent regressive and non-regressive rotationally symmetric optical design elements; and (4) the gradient of the optical power profile of each constituent regressive and non-regressive rotationally symmetric optical design elements.

Figure 4:
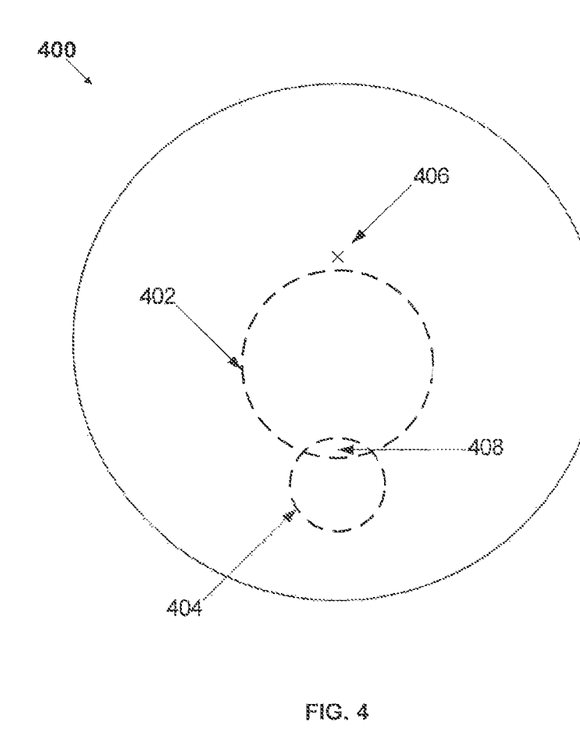
FIG. 4 illustrates a progressive addition lens (PAL) comprising at least one regressive rotationally symmetric optical design element and at least one non-regressive rotationally symmetric optical design element.

FIG. 4 illustrates a PAL 400 comprising at least one regressive rotationally symmetric optical design element 402 and at least one non-regressive rotationally symmetric optical design element 404. Specifically, the regressive and non-regressive rotationally symmetric optical design elements 402 and 404 can each be formed such that their overlapping power profiles form a continuous progression of optical power between a distance region of the PAL 400 and a near vision region of the PAL 400 for example, so as to form an intermediate vision zone or channel of the PAL 400.

The regressive and non-regressive rotationally symmetric optical design elements 402 and 404 can be centered along a principal meridian of the PAL 400. The regressive rotationally symmetric optical design element 402 can have an approximate radius ranging from 2.0 mm to 250 mm. The non-regressive rotationally symmetric optical design element 404 can have an approximate radius ranging from 2.0 mm to 25.0 mm. A center of the regressive rotationally symmetric optical design element 402 can be positioned up to approximately 20.0 mm below a fitting point 406 of the PAL 400. A center of the non-regressive rotationally symmetric optical design element 402 can be positioned up to approximately 25.0 mm below a center of the regressive rotationally symmetric optical design element 402.

By varying the sizes, optical power profiles, and positioning of the regressive and non-regressive rotationally symmetric optical design elements 402 and 404, the PAL 400 can be formed to have any desired optical power profile as well as any desired vision zone size and optical power. Combining the regressive and non-regressive rotationally symmetric optical design elements 402 and 404 as shown in FIG. 4 (i.e., such that a portion of each element overlaps the other) can be enable neutralization of the astigmatic vectors along the radial direction connecting the centers of each of the regressive and non-regressive rotationally symmetric design elements 402 and 404 (e.g., in at least a portion of the lens 408).

The PAL 400 can be a composite or monolithic lens. The regressive and non-regressive rotationally symmetric optical design elements 402 and 404 can be positioned on the same surface of the PAL 400 or on different surfaces of the PAL 400.

The sizes and positioning of the regressive and non-regressive optical design elements 402 and 404 as shown in FIG. 4 are for illustrative purposes only. In general, a PAL lens can be designed using one regressive and one non-regressive rotationally symmetric optical design elements. As discussed above, overlapping regions of the constituent regressive and non-regressive elements can provide a total add power of the PAL and can have a level of unwanted astigmatism that is less than the sum of the astigmatism levels of each individual region.

Figure 5:
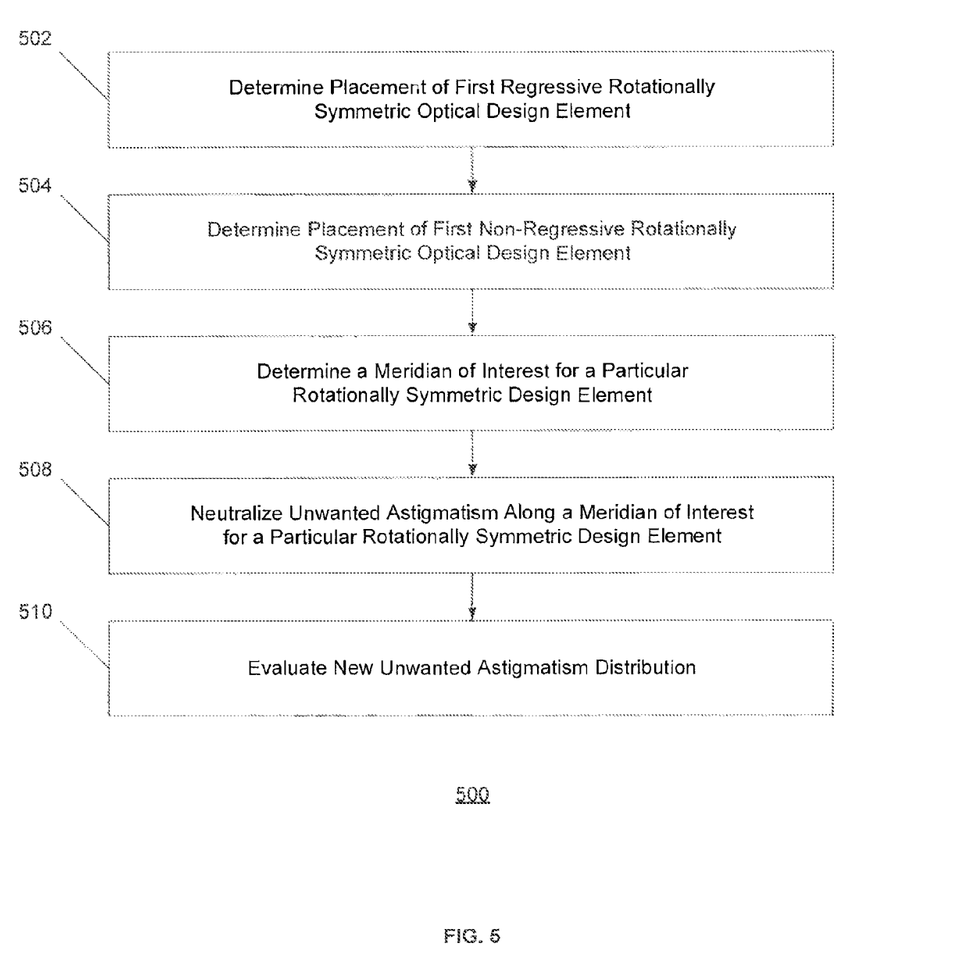
FIG. 5 provides a flowchart that illustrates operational steps for designing a lens using one or more regressive rotationally symmetric optical design elements and one or more non-regressive rotationally symmetric optical design elements.

FIG. 5 provides a flowchart 500 that illustrates general operational steps for designing a lens using one or more regressive rotationally symmetric optical design elements and one or more non-regressive rotationally symmetric optical design elements. The steps illustrated in FIG. 5 can provide a method for adding multiple rotationally symmetric optical design elements to a lens surface to form a multifocal lens—for example, a PAL.

In general, the method illustrated in FIG. 5 takes advantage of the mutually orthogonal astigmatism vectors inherently associated with regressive and non-regressive rotationally symmetric optical design elements to specify how these constituent design elements can be used to form a desired optical design with reduced or lowered levels of unwanted astigmatism. As will be appreciated by those skilled in the relevant arts, the method illustrated in FIG. 5 and described below can be adapted to generate any lens including, but not limited to, a multifocal lens or single vision lens with or without discontinuities.

As will be described below, the characteristics of each constituent rotationally symmetric optical design element (e.g., radius, optical power profile, and position/location) can be varied for a particular design. Below, the steps illustrated in FIG. 5 are described in regards to an exemplary PAL design comprising at least one regressive and at least one non-regressive rotationally symmetric optical design element collapsed onto the same lens surface. As will be appreciated by those skilled in the relevant arts, the steps can be adapted to accommodate a composite lens and placement of rotationally symmetric optical design elements onto one or more surfaces of the composite lens.

At step 502, a desired placement of a first regressive rotationally symmetric optical design element onto a lens surface can be determined. PALs are generally characterized as having a far vision zone, a near vision zone, and a zone of continuously increasing power connecting the far and near vision zones (often referred to as the channel of the PAL).

Since PALs generally have the lowest additive power (in many cases no additive power) in the far vision zone, the first regressive rotationally symmetric optical design element can be positioned in or near this far distance zone. Specifically, as an example, the first regressive rotationally symmetric optical design element can be positioned near a fitting point of a PAL (e.g., centered about the fitting point of a PAL).

Figure 6A:
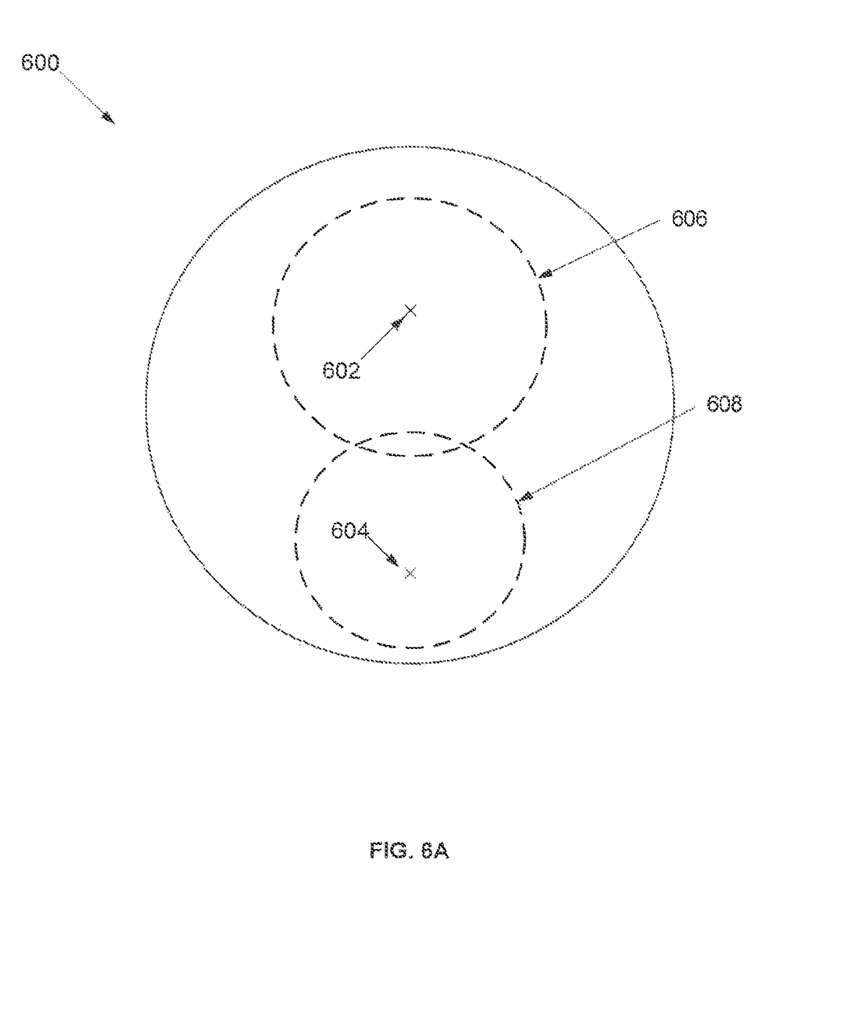
FIGS. 6A-6D illustrate a PAL lens surface designed in accordance with the operational steps depicted in FIG. 5.

FIG. 6A illustrates an initial first step in the creation of a PAL designed in accordance with the method illustrated in FIG. 5. As shown in FIG. 6A, a PAL lens surface 600 comprises a fitting point 602 and a near vision point 604. In accordance with step 502, a first regressive rotationally symmetric optical design element 606 can be positioned over a far distance zone of the PAL lens surface 600. The first regressive rotationally symmetric optical design element 606 can be centered about the fitting point 602 of the PAL lens surface 600 but is not so limited. The optical power profile of the first regressive rotationally symmetric optical design element 606 can be set to help form the channel of the PAL lens surface 600 as well as the far distance vision zone.

At step 504, a desired placement of a first non-regressive rotationally symmetric optical design element onto a lens surface can be determined. Since PALs generally have the highest additive power in the near vision zone, the first non-regressive rotationally symmetric optical design element can be positioned in this near vision zone. Specifically, the first non-regressive rotationally symmetric optical design element can be positioned near the near vision point of a PAL (e.g., centered about the near vision point of a PAL). Further, the first non-regressive rotationally symmetric optical design element can be positioned to align with the first regressive rotationally symmetric optical design element to complete the desired optical power profile of the channel of the PAL. The positioning and size of the first regressive rotationally symmetric optical design element can help to determine the width of the near vision zone.

As shown in FIG. 6A, in accordance with step 504, a first non-regressive rotationally symmetric optical design element 608 can be positioned over a near distance zone of the PAL lens surface 600. The first non-regressive rotationally symmetric optical design element 608 can be centered about the near vision point 604 of the PAL lens surface 600 but is not so limited. The optical power profile of the first regressive rotationally symmetric optical design element 606 can be set to help form the channel of the PAL lens surface 600 as well as the near distance vision zone.

Steps 502 and 504 together can be viewed as setting or determining the initial characteristics of a PAL. Specifically, placement of the first regressive and first non-regressive rotationally symmetric optical design elements can largely determine the channel power progression, near vision zone characteristics (e.g., size and level of included unwanted astigmatism), and far vision zone characteristics (e.g., size and level of included unwanted astigmatism) of the PAL. Accordingly, the features of the regressive and first non-regressive rotationally symmetric optical design elements—for example, optical power profile, radius, and position—can be flexibly adjusted and varied as necessary to achieve these initial lens characteristics.

The next steps of the method illustrated in FIG. 5 can be viewed as accomplishing further refinement of the PAL. These next steps can adjust the vision zone characteristics of the PAL and can reduce or neutralize unwanted astigmatism. To accomplish this, at step 506, a meridian of interest can be determined. A meridian of interest can be determined for any regressive or non-regressive rotationally symmetric optical design element that is positioned on the PAL. The meridian of interest can specify an outward direction relative to a center of a rotationally symmetric optical design element. The meridian of interest can simply provide a tool for determining a direction or area of the PAL—relative to a specific design element—that will be the next area evaluated for further refinement (e.g., by the inclusion of additional rotationally symmetric optical design elements).

Figure 6B:
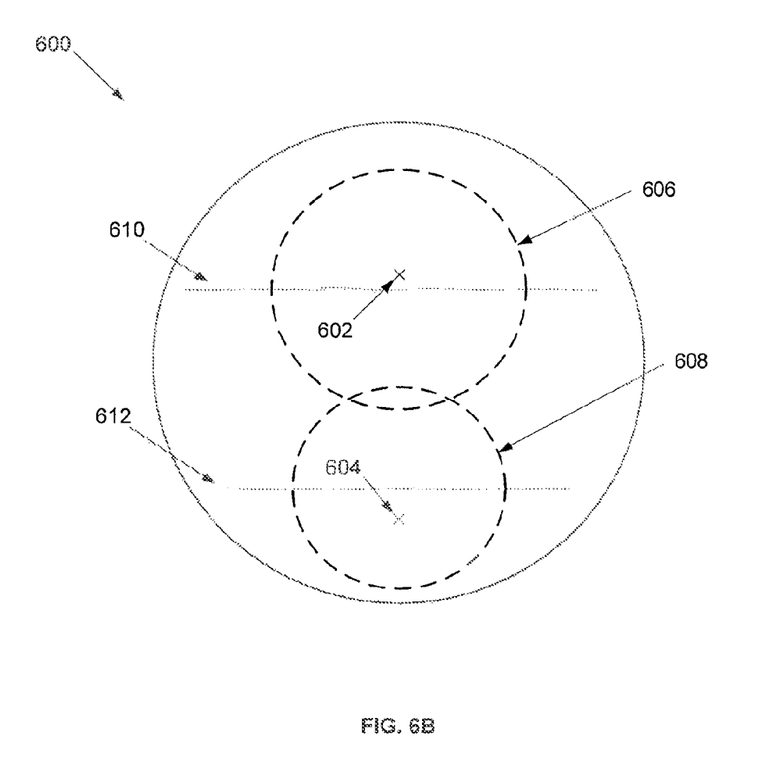

FIG. 6B illustrates a first exemplary meridian of interest 610 established relative to a center of the first regressive rotationally symmetric optical design element 606. As shown in FIG. 6B, the first exemplary meridian of interest 610 can bisect the first regressive rotationally symmetric optical design element 606 into two equally sized halves.

FIG. 6B also shows a second exemplary meridian of interest 612 established relative to a center of the first non-regressive rotationally symmetric optical design element 608. As shown in FIG. 6B, the second exemplary meridian of interest 612 can bisect the first non-regressive rotationally symmetric optical design element 608 into two equally sized halves.

As mentioned above, the meridian of interest can be established to simply select a direction from which to further refine the initial PAL lens surface design determined after steps 502 and 504. Specifically, after establishing a meridian of interest, the PAL lens surface characteristics aligned or near the meridian of interest can be evaluated and adjusted by adding further rotationally symmetric optical design elements approximately centered about the established meridian of interest.

As an example, an established meridian of interest can be used to determine a direction for evaluating a section of the PAL lens surface that may benefit from additional design elements to adjust the lens characteristics. In many instances, the established meridian of interest can be used to evaluate the unwanted astigmatism Lear the meridian of interest and the characteristics of the next design element to add to the PAL lens surface that can best neutralize the unwanted astigmatism. Accordingly, at step 508, astigmatism along the meridian of interest can be neutralized or reduced by the introduction of one or more rotationally symmetric optical design elements.

Figure 6C:
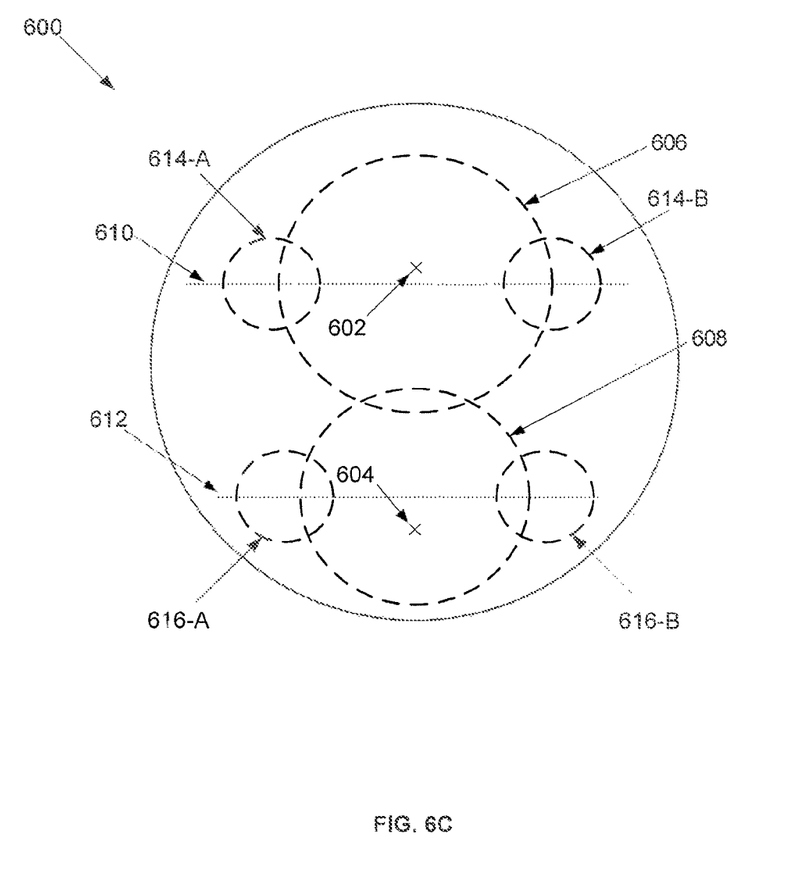

FIG. 6C shows additional rotationally symmetric design elements 614-A and 614-B established along the first meridian of interest 610. The rotationally symmetric design elements 614-A and 614-B can be designed to help neutralize design element 606. The rotationally symmetric design elements 614-A and 614-B can be designed to be positioned and have characteristics that are independent of one another (and not necessarily symmetric as shown in FIG. 6C).

As an example, the rotationally symmetric design elements 614-A and 614-B can each be non-regressive rotationally symmetric optical design elements that can neutralize the unwanted astigmatism associated with a portion of the periphery of the first regressive rotationally symmetric optical design element 606.

Also shown in FIG. 6C are additional rotationally symmetric design elements 616-A and 616-B established along the second meridian of interest 612. The rotationally symmetric design elements 616-A and 616-B can be designed to help neutralize astigmatism associated with the first non-regressive rotationally symmetric optical design element 608. The rotationally symmetric design elements 616-A and 616-B can be designed to be positioned and have characteristics that are independent of one another (and not necessarily symmetric as shown in FIG. 6C).

As an example, the rotationally symmetric design elements 616-A and 616-B can each be regressive rotationally symmetric optical design elements that can neutralize the unwanted astigmatism associated with a portion of the periphery of the first non-regressive rotationally symmetric optical design element 608.

After the placement of the additional rotationally symmetric design elements to adjust the PAL lens characteristics along an established meridian of interest (e.g., to neutralize astigmatism as described above), at step 510, a new unwanted astigmatism distribution can be determined. Additional PAL lens characteristics—such as vision zone width and astigmatism levels and additive power—can also be determined at this step.

After step 510, steps 506 through 510 can be repeated as many times as desired to reach an acceptable PAL lens design. Specifically, additional meridians of interest can be defined and additional rotationally symmetric optical design elements can be added to the PAL lens surface until a specific design is achieved. As an example, a target design can be set and compared to each iterative design resulting after step 510 to determine if additional iterations can be used to move the iterative design closer to the target design.

Figure 6D:
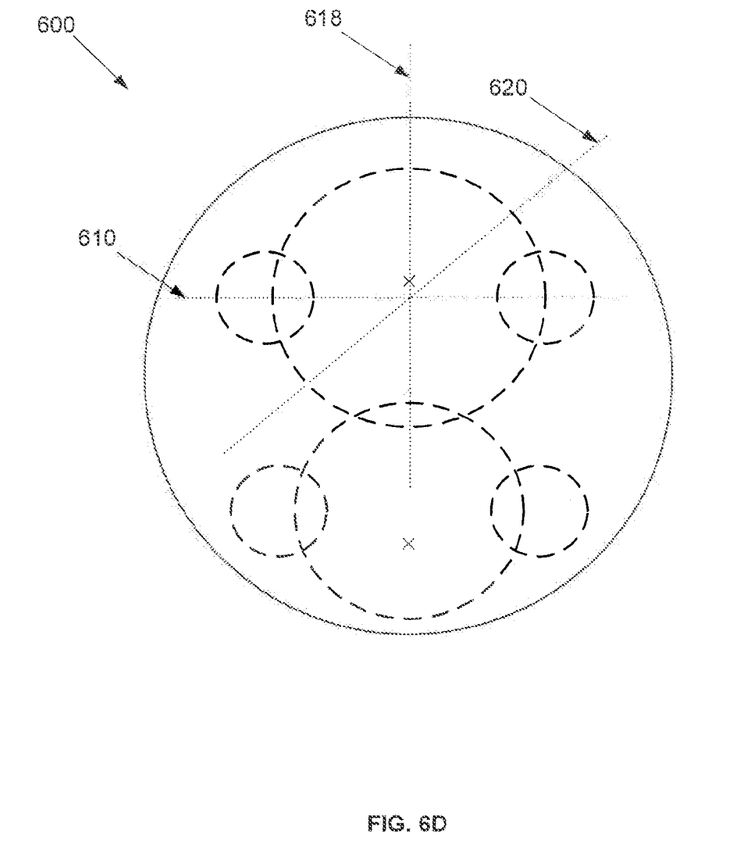

FIG. 6D shows an example of how additional meridians of interest can be established. After establishing a first meridian of interest for a design element—for example, meridian 610 established relative to the regressive rotationally symmetric design element 606—a second meridian of interest for the particular design element can be established that is orthogonal to the first meridian of interest. In FIG. 6D, this perpendicular meridian of interest is shown as meridian 618. After the meridians 610 and 618 are established, further meridians of interest can be established by repeatedly bisecting previously established meridians. As shown in FIG. 6D, meridian 620 bisects the meridians 610 and 618. Additional meridians—e.g., a meridian that bisects meridians 618 and 620—can then be established off of this repeatable process.

In general, the method illustrated in FIG. 5 can be used to refine PAL lens characteristics in any manner and so is not limited to the use of meridians (or the exemplary method for defining meridians) as described above. For example, rotationally symmetric optical design elements of the present invention can be added to the design of a PAL lens in any manner including a random manner or by focusing on specific zones or portions of the lens surface.

Further, the method illustrated in FIG. 5 is not limited to the position of rotationally symmetric optical design elements onto the same lens surface but instead can be adapted to accommodate positioning these elements onto one or more lens surfaces including internal surfaces.

Figure 7:
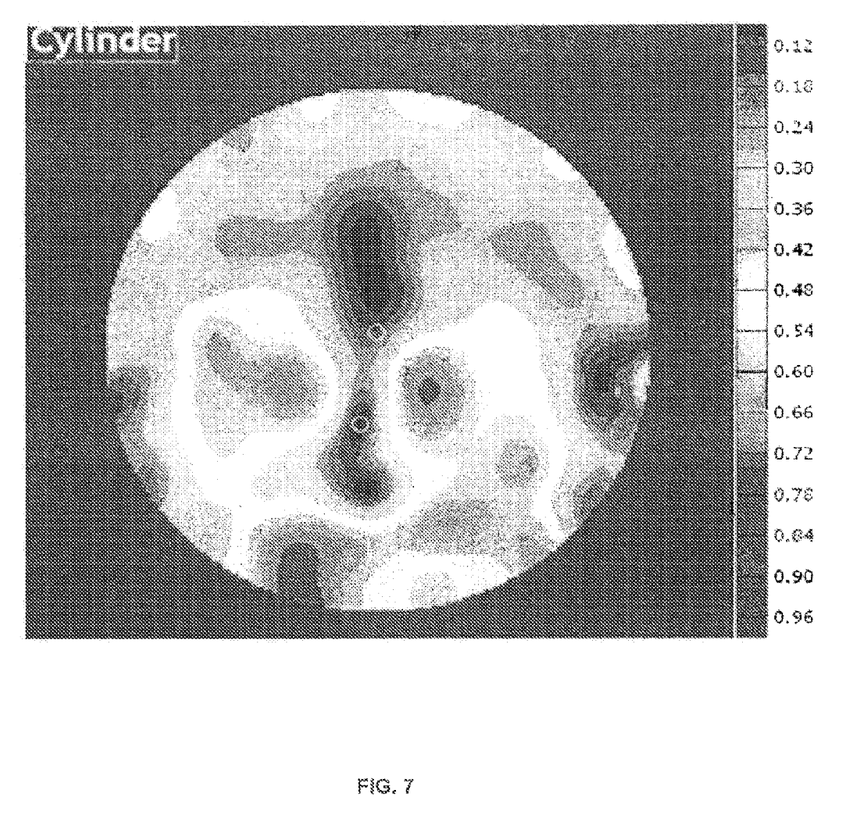
FIG. 7 provides a display capture from a Rotlex lens surface mapping system.

FIG. 7 provides a display capture 700 from a Rotlex lens surface mapping system. The display capture 700 shows the astigmatism contours for a lens made in accordance with the method illustrated in FIG. 5. Specifically, the astigmatism contours shown in the display capture 700 are of a lens that comprises at least one rotationally symmetric regressive optical design element and at least one rotationally symmetric non-regressive optical design element. The mapped lens provides approximately 1.50 D of optical add power and has a maximum astigmatism level of approximately 0.74 D (as measured by the Rotlex lens surface mapping system).

Any number of rotationally symmetric optical design elements can be used to create a PAL or to adjust a PAL lens surface. As mentioned above, when a target design is substantially achieved, the processes for adding additional elements can be ended. Evaluation of the current iterative design and the target design can include the use of weighted regions of the lens to specify regions having more importance to the visual comfort and performance provide by the final lens design. Any rotationally symmetric optical design element added to the lens design can include one or more discontinuous features. Step 510 can determine a new unwanted astigmatism for a portion of the lens design based on whether or not the current design includes overlapping design elements and the extent of blending.

As described above in relation to the method illustrated in FIG. 5, optimization of a lens design incorporating one or more regressive and non-regressive rotationally symmetric optical design elements can be an iterative procedure. Such an iterative design process can involve comparing a trial design (the output of a specific iteration) with a target design in a quantitative fashion. Differences between the trial design and the target design can then be determined. An evaluation can then be made, based on the determined differences, as to whether a subsequent iteration (involving the addition of one or more additional rotationally symmetric optical design elements) should be implemented to further minimize the overall difference between the iterative trial design and the target design.

The overall difference between the two designs can be quantified in terms of a function that captures the critical optical parameters as a function of location on the lens. The function can allow a user to assign coefficients to each lens location to weight each location in proportion to its impact on visual performance or comfort. After a final iteration, a designed lens can be analyzed and further refined using an optical design software package such as ZEMAX using an eye model such as the Liu Brennan (LB) model.

In general, all or a portion of the following design process can be used to develop lenses comprising one or more regressive and non-regressive rotationally symmetric optical design elements:

1. Lens surface creation—Surface creation can begin with the superposition of two or more rotationally symmetric optical design elements, at least one of which is regressive and at least one which is non-regressive. This can be achieved using, as an example, steps 502 and 504 described above.
2. Surface optimization—The resulting design can then be modified to alter its power and astigmatism profiles by further superposition of rotationally symmetric optical design elements. Both regressive and non-regressive design elements can be selected as desired—selected, for example, by trial and error. This can be achieved using, for example, the iterative design process described above in relation to repeatable steps 506-510.
3. Additional optimization—Commercially available optical design software can then be used to further refine/optimize the lens design. For example, the lens design can be further analyzed and optimized using ray tracing analysis.
4. Final optimization—Final optimization can be carried out using an eye model—for example, the LB eye model.

As part of any of the lens design processes described above, an angular scaling function can be used to alter an angular segment of any rotationally symmetric optical design element (regressive or non-regressive). An angular scaling function can modify the rotationally symmetrical power distribution provided by an initial rotationally symmetric optical design element.

An aspect of the present invention enables a target or desired optical design for a lens to be achieved when on one or more additional optical features are added to a lens during final lens processing. For example, a semi-finished lens blank can be free-formed to add a progressive addition optical power region onto an external surface of the lens. To account for this subsequent processing step and added optical element, the target design can be adjusted such that—once the free-formed optical element is added to the lens—the target design results. As an example, suppose a desired final or target design (after all processing/free-forming) can be represented by X. Next, suppose an optical feature Y will be free-formed onto an external surface of the lens (either the front or back surface of the lens). To ensure that the target design X results after Y is added to the lens, the added optical feature Y can initially be subtracted from the target design and formed prior to free-forming. Specifically, the design X-Y can be formed initially such that once Y is free-formed onto the lens, X—the final desired design—results. The design X-Y can be formed on a single surface of the lens (either an internal or external lens surface) or can be formed over multiple lens surfaces (e.g., using one or more internal lens surfaces or interfaces) by decomposing the X-Y design into constituent components placed in optical communication.

CONCLUSION

While various embodiments of the present invention have been described above, it should be understood that they have been presented by way of example and not limitation. The optical features and elements of the present invention can be combined with any other conventional optical feature or element. The optical features and elements of the present invention can be positioned on any surface of a lens (including interior or buried surfaces) and can contribute to the optical power of any vision zone of a multifocal lens. Lenses of the present invention can be semi-finished lens blanks, finished lenses and unfinished lens blanks. It will be apparent to one skilled in the pertinent art that various changes in form and detail can be made therein without departing from the spirit and scope of the invention. Therefore, the present invention should only be defined in accordance with the following claims and their equivalents.

What is claimed is:

1. A method of making a lens, comprising:
    forming a first regressive rotationally symmetric optical design element having a first perimeter that provides an optical power profile within a first optical power region in which the power continuously or discontinuously increases from the center of the first optical power region to the first perimeter;
    forming a first non-regressive rotationally symmetric optical design element having a second perimeter that provides an optical power profile within a second optical power region in which the power continuously or discontinuously decreases from the center of the second optical power region to the second perimeter;
    forming a second non-regressive rotationally symmetric optical design element having a third perimeter that provides an optical power profile within a third optical power region in which the power continuously or discontinuously decreases from the center of the third optical power region to the third perimeter, wherein the first perimeter and the third perimeter overlap; and
    forming a second regressive rotationally symmetric optical design element having a fourth perimeter that provides an optical power profile within a fourth optical power region in which the power continuously or discontinuously increases from the center of the fourth optical power region to the fourth perimeter, wherein the second perimeter and the fourth perimeter overlap;
    wherein the first regressive rotationally symmetric optical design element and the second non-regressive rotationally symmetric optical design element are located on the same surface;
    wherein the first regressive rotationally symmetric optical design element and the first non-regressive rotationally symmetric optical design element are located on the same surface.

2. The method of claim 1, wherein the first perimeter and the second perimeter overlap.

3. The method of claim 1, wherein the first non-regressive rotationally symmetric optical design element and the second regressive rotationally symmetric optical design element are located on the same surface.

4. A method of making a lens, comprising:
    forming a first regressive rotationally symmetric optical design element having a first perimeter that provides an optical power profile within a first optical power region in which the power continuously or discontinuously increases from the center of the first optical power region to the first perimeter;
    forming a first non-regressive rotationally symmetric optical design element having a second perimeter that provides an optical power profile within a second optical power region in which the power continuously or discontinuously decreases from the center of the second optical power region to the second perimeter;
    forming a second non-regressive rotationally symmetric optical design element having a third perimeter that provides an optical power profile within a third optical power region in which the power continuously or discontinuously decreases from the center of the third optical power region to the third perimeter, wherein the first perimeter and the third perimeter overlap; and
    forming a second regressive rotationally symmetric optical design element having a fourth perimeter that provides an optical power profile within a fourth optical power region in which the power continuously or discontinuously increases from the center of the fourth optical power region to the fourth perimeter, wherein the second perimeter and the fourth perimeter overlap;
    forming a third non-regressive rotationally symmetric optical design element having a fifth perimeter that provides an optical power profile within a fifth optical power region in which the power continuously or discontinuously decreases from the center of the fifth optical power region to the fifth perimeter, wherein the first perimeter and the fifth perimeter overlap, and wherein the third non-regressive rotationally symmetric optical design element is located directly across a vertical axis through a center point of the lens from the second non-regressive rotationally symmetric optical design element.

5. A method of making a lens, comprising:
    forming a first regressive rotationally symmetric optical design element having a first perimeter that provides an optical power profile within a first optical power region in which the power continuously or discontinuously increases from the center of the first optical power region to the first perimeter;
    forming a first non-regressive rotationally symmetric optical design element having a second perimeter that provides an optical power profile within a second optical power region in which the power continuously or discontinuously decreases from the center of the second optical power region to the second perimeter;

forming a second non-regressive rotationally symmetric optical design element having a third perimeter that provides an optical power profile within a third optical power region in which the power continuously or discontinuously decreases from the center of the third optical power region to the third perimeter, wherein the first perimeter and the third perimeter overlap;

forming a second regressive rotationally symmetric optical design element having a fourth perimeter that provides an optical power profile within a fourth optical power region in which the power continuously or discontinuously increases from the center of the fourth optical power region to the fourth perimeter, wherein the second perimeter and the fourth perimeter overlap; and forming a third regressive rotationally symmetric optical design element having a sixth perimeter that provides an optical power profile within a sixth of power region in which the power continuously or discontinuously increases from the C rater of the sixth optical power region to the sixth perimeter, wherein the second perimeter and the sixth perimeter overlap, and wherein the third regressive rotationally symmetric optical design element is located directly across a vertical axis through a center point of the lens from the second regressive rotationally symmetric optical design element.

* * * * *